Nov. 11, 1924.  
L. R. HEBERT ET AL  
1,515,041  
AUTOMATIC BRAKE ACTUATOR FOR MOTOR VEHICLES  
Filed Dec. 18, 1922
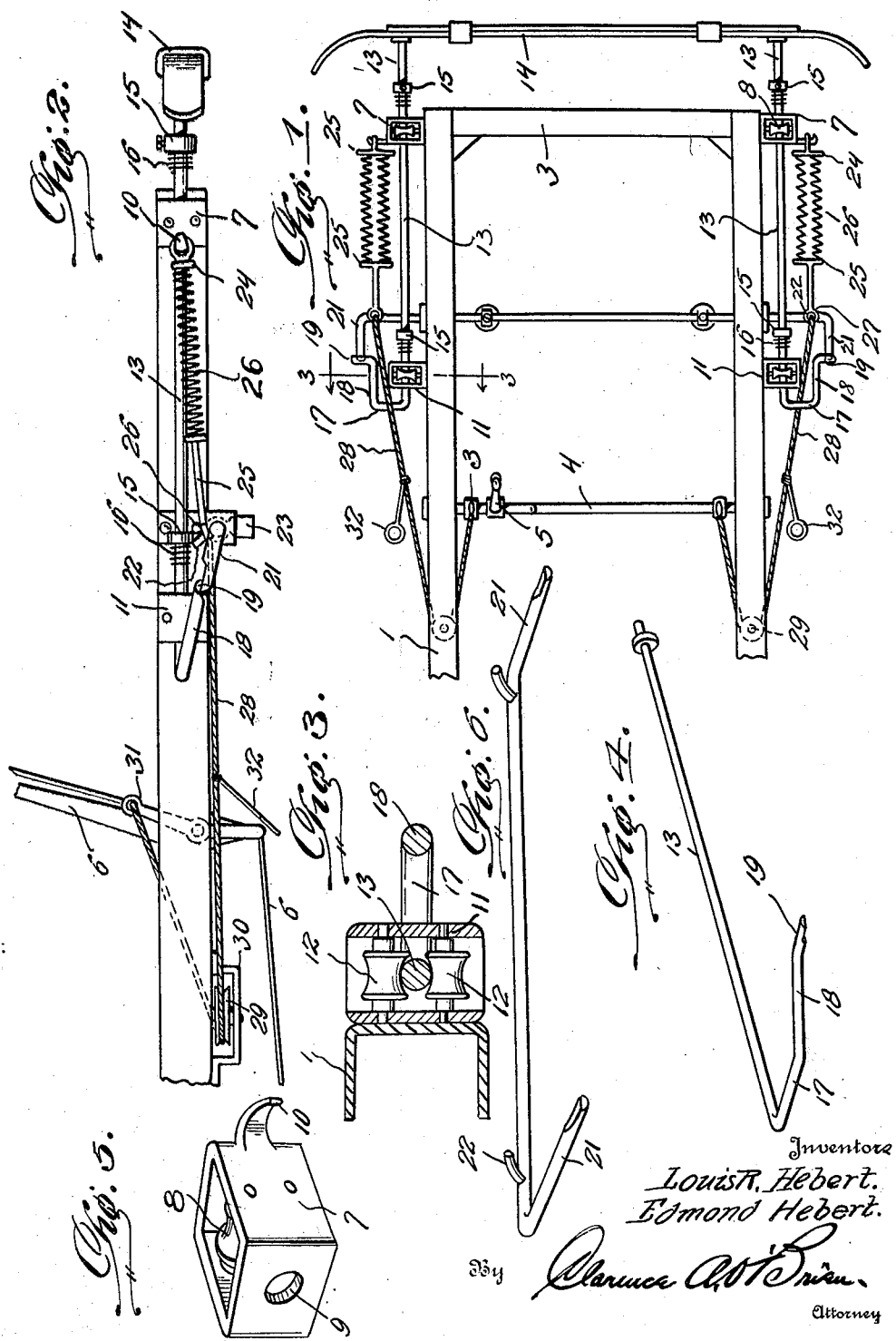
Inventors  
Louis R. Hebert.  
Edmond Hebert.  
By  
Clarence A. O'Brien.  
Attorney Patented Nov. 11, 1924.

1,515,041

UNITED STATES PATENT OFFICE.

LOUIS R. HEBERT AND EDMOND HEBERT, OF FALL RIVER, MASSACHUSETTS.

AUTOMATIC BRAKE ACTUATOR FOR MOTOR VEHICLES.

Application filed December 18, 1922. Serial No. 607,571.

*To all whom it may concern:*

Be it known that we, LOUIS R. HEBERT and EDMOND HEBERT, citizens of the United States, residing at Fall River, in the county of Bristol and State of Massachusetts, have invented certain new and useful Improvements in Automatic Brake Actuators for Motor Vehicles, of which the following is a specification.

Our invention resides in the provision of an automatic brake actuator for motor vehicles wherein the brakes are actuated for positively stopping the machine when it collides with a person, vehicle or the like.

The primary object of this invention is the provision of such a device that is substantially simple of construction, highly efficient of operation and such a device that may be readily installed upon any and all types of motor vehicles now on the market.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a top plan view of the front end of a motor vehicle frame, disclosing our improved brake actuating mechanism associated therewith.

Figure 2 is an elevational view of one side thereof.

Figure 3 is a transverse cross sectional view upon the line 3—3 of Figure 1, and looking rearwardly in the direction of the arrows.

Figure 4 is a perspective view of one of the trip arms or rods employed in connection with the present invention.

Figure 5 is a perspective view of one of the front roller carrying brackets employed by us, and Figure 6 is a view similar to Figure 5 of what may be termed an angular rod for one end of a pair of tension springs employed in conjunction with our invention.

With particular reference to the drawings, we have shown our device as associated with a motor vehicle comprising the usual chassis frame including side bars 1 and 2, and a front connecting bar 3. The rear ends of these bars 1 and 2 are connected by another bar similar to the front member 3 as is readily apparent. Between the side frame bars 1 and 2, and spaced from the front ends thereof, is the usual transverse shaft 4, journaled between these bars and carrying the usual operating handle 5, this shaft 4 having operative connections with the motor vehicle brakes through the instrumentality of the rearwardly extending rod 6.

Upon the outer sides of each frame bar 1 and 2 and at the front end thereof are roller carrying rectangular shaped bracket members 7. As more clearly shown in Figure 5, these members 7 have a pair of rollers 8 journaled therein, and the front and rear walls of each of these brackets 7 are provided with openings 9 for purposes hereinafter described. Each of these brackets 7 is formed with curved lugs or ears 10.

Rearwardly of the front bracket 7 are other roller carrying brackets 11 also secured to the outer sides of the frame bars 1 and 2. These brackets 11 are substantially the same as the brackets 7, they also carrying a pair of rollers 12, and being provided with a front and rear opening.

Engaging through the openings in alined roller brackets 7 and 11 upon opposite sides of the vehicle chassis, is a bar or rod 13, engaging between each pair of rollers in the bracket, and adapted for a free rectilinear movement at the opposite sides of the machine frame. The front ends of the rods 13 are connected in any manner desirable to a suitable form of spring bumper 14 and formed or secured upon each of the rods 13 and forwardly of each roller bracket 7 and 11 are collars 15. Encircling these rods between each collar and roller bracket are coiled springs 16 functioning as a cushioning means for the rods 13, when the same are slid rearwardly.

The opposite end of each rod 13 is right angularly bent as at 17, and formed upon the end of this right angular portion is a forwardly extending and downwardly bent arm 18 which carries a laterally extending right angular lug or finger 19. Slightly forwardly of the rear roller carrying brackets 11 and journaled between the frame bars 1 and 2 is a rock shaft 20, the ends thereof being rearwardly bent as at 21. Adjacent the bent ends 21 of this rock shaft 20 are vertical rearwardly curved pins 22 in substantial alinement with the before mentioned curved fingers 10 upon the front roller carrying brackets 7. As a means for normally maintaining the rock shaft 20 in the position shown in Figures 1 and 2, we have provided weights 23 secured at convenient points thereon. Engaging over each curved finger 10 of the front roller carrying brackets 7 is a T-plate 24, and between each of these T-plates 24 and other T-plates 25, are secured a pair of relatively strong coiled springs 26. The last mentioned T-plates 25 are formed with a ring end 27 for receiving one end of the cables 28. These cables 28 extend rearwardly and are trained over rollers 29 supported by brackets 30 which are secured to the under surface of each of the frame bars 1 and 2. Each cable 28 extends forwardly between the frame bars and is connected at its opposite end to the upper end of lever 31, which levers are keyed to the said brake controlling shaft 4.

Each cable 28 is provided with a pull handle 32, and when the several elements constituting our invention are in a position as shown in Figures 1 and 2, the motor vehicle brakes will be moved to a braking position when the bumper 14 contacts with an obstacle.

In setting the device, the bumper 14 is extended forwardly for engaging the fingers 19 of the rods 13 over the rearwardly bent ends 21 of the rock shaft 20, this shaft normally assuming the position as shown in Figures 1 and 2, through the instrumentality of the weights 23. The cables 28 are thence pulled rearwardly for engaging the rings 27 of the T's 25 over the pins 22 of the rock shaft 20, this movement occasioning an expansion of the springs 26.

In view of the above description, it will at once be apparent that should the bumper 14 strike an obstacle, the rods 13 will be moved rearwardly for releasing the rock shaft 20, at which time, the pairs of springs 26 will occasion a pull upon the cables 28 for consequently rocking the brake operating shaft 4 in a rearward direction for pulling up on the brake rod 6 thereby stopping the machine.

It is preferable that this device be employed in connection with automobiles of the Ford type, wherein the power clutch thereof is connected to the brake handle in such a manner as to be disengaged when the brake is applied, but it is nevertheless apparent that our device may be associated with other types of motor vehicles, and while we have herein shown and described the preferred embodiment of the present invention, it is nevertheless to be understood that minor changes may be made therein, without departing from the spirit and scope of the invention as claimed.

What we claim as new is:—

1. A brake actuator for motor vehicles having a frame and brake operating mechanism including operating means normally acting to operate the brake operating mechanism for applying the brakes to the vehicle, bumper carried members slidable in the frame, and holding means carried by the frame adapted for cooperative engagement with the bumper carried members and the operating means, for releasably holding said operating means in inoperative position.

2. A brake actuator for motor vehicles including operable means normally operable to apply the brakes of the vehicle, a member mounted for sliding movement on the vehicle, a bumper mounted on the slide member for operating said member when the bumper strikes an object, and a rotatable member adapted to engage and hold the first mentioned means in inoperative position when in engagement with the slide member, and released upon the sliding movement of said member when operated by the bumper for rotation to release the first mentioned means.

3. A brake actuator for motor vehicles having a brake operating mechanism including spring operated means normally operable to actuate the brake operating mechanism for applying the brakes of the vehicle, a slidable holding element having a bumper mounted thereon in front of the vehicle, and a rotatable member for engagement with the slidable element adapted to hold said spring under tension when engaged with said element, whereby a sliding movement of said element will permit rotation of said member for releasing the spring to operate the brake.

4. A brake actuator for motor vehicles having a frame and brake operating mechanism including a pair of bumper carried rods slidably mounted on the frame, a shaft rotatable in the frame having fingers adapted to engage the terminals of said rods in one position thereof relative to the frame, springs having one end secured to the frame and the other end connected with the brake mechanism for normally operating said mechanism to apply the brakes of the vehicle, and lugs on the shaft adapted for engagement with the spring connections to hold said springs under tension and inoperative when the fingers are in engagement with the terminals of said rods.

In testimony whereof we affix our signatures.

LOUIS R. HEBERT.
EDMOND HEBERT.